United States Patent
Hanlon et al.

(10) Patent No.: US 8,077,432 B2
(45) Date of Patent: Dec. 13, 2011

(54) DISK STACK ASSEMBLY WITH SPINDLE MOTOR HUB HAVING IMPROVED DISK-SUPPORTING FLANGE

(75) Inventors: Andrew Hanlon, San Jose, CA (US); Fu-Ying Huang, San Jose, CA (US); Lidu Huang, Danville, CA (US); Antony Nguyen, San Jose, CA (US); Hamid Salehizadeh, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 454 days.

(21) Appl. No.: 12/402,476

(22) Filed: Mar. 11, 2009

(65) Prior Publication Data

US 2010/0232060 A1     Sep. 16, 2010

(51) Int. Cl.
*G11B 17/08*  (2006.01)
(52) U.S. Cl. ............. 360/99.08; 360/98.08; 360/99.12
(58) Field of Classification Search ............ 360/98.08, 360/99.12
See application file for complete search history.

(56) References Cited

U.S. PATENT DOCUMENTS

| | | | |
|---|---|---|---|
| 5,457,589 A * | 10/1995 | Leuthold et al. | 360/99.12 |
| 6,172,844 B1 | 1/2001 | Luo et al. | |
| 6,208,486 B1 * | 3/2001 | Gustafson et al. | 360/98.08 |
| 7,215,509 B2 | 5/2007 | Ng | |
| 7,307,813 B1 | 12/2007 | Suwito | |
| 7,545,601 B2 * | 6/2009 | Hanada et al. | 360/98.08 |

* cited by examiner

*Primary Examiner* — Tan T. Nguyen
(74) *Attorney, Agent, or Firm* — Thomas R. Berthold

(57) ABSTRACT

An improved disk stack assembly for a hard disk drive (HDD) includes a generally cylindrical hub with flange having a downward sloping conical flange surface. The conical flange surface is defined between a radially inner circular ridge and a radially outer circular edge. The bottom disk in the stack is in contact with the flange inner circular ridge. The disk stack assembly also includes a disk clamp with a contact surface having a contact rim that is in contact with either the radially inner portion of the top disk in the stack or a spacer ring. The clamp contact rim is located at approximately the same radial distance from the hub's central cylindrical axis as the flange circular ridge so that the clamping force is applied to the disks close to the area where the disk stack is supported on the conical flange surface.

18 Claims, 9 Drawing Sheets

DISK STACK ASSEMBLY WITH SPINDLE MOTOR HUB HAVING IMPROVED DISK-SUPPORTING FLANGE

BACKGROUND OF THE INVENTION

1. Field of the Invention

This invention relates generally to data recording disk drives, like magnetic recording hard disk drives (HDDs), and more particularly to the disk stack assembly that is mounted for rotation on the disk drive spindle motor.

2. Description of the Related Art

In a magnetic recording hard disk drive (HDD) the recording disks are stacked on a disk stack assembly that is mounted to a disk drive spindle motor. The spindle motor is mounted to the disk drive base and rotates the disks about a central axis. An air-bearing slider that supports a magnetic recording read/write is associated with each disk surface. Each of the sliders is connected to a rotary actuator by a suspension and actuator arm. The actuator moves the sliders across their respective disk surfaces while an air-bearing, generated between the slider and its associated disk surface as the disks rotate, supports each slider in close proximity and near-contact with its associated disk surface.

The distance between the slider and its associated disk surface is called the "fly height". While the fly height of each slider varies as a function of disk radius it is important that the fly height behavior of all the sliders be relatively predictable and consistent for all sliders across their associated disk surfaces. This requires that all the disk surfaces be as perfectly planar as possible.

The disk stack assembly includes a generally cylindrically shaped hub that is mounted to the spindle motor for rotation about the spindle motor's central axis. The hub includes a radially extending flange. The disks are stacked on the flange with spacer rings between them to allow the sliders to access their respective disk surfaces. A disk clamp is secured to the hub and clamps the stack of disks and spacer rings to the flange. The clamped disks in the disk stack assembly often exhibit "coning" or "cupping", i.e., the disk surfaces have a slight conical shape instead of being perfectly planar. Coning is undesirable because it affects the fly height of the sliders and can prevent the sliders on different disk surfaces from having generally the same fly height behavior across their respective disk surfaces. As thinner disks come into use to accommodate the need for more compact disk drives, the coning effect becomes even more significant. The extent of coning is related to the amount of clamping force. Even if a disk stack assembly is designed with a supposedly optimum clamping force to minimize coning, it is difficult to control the clamping force to within a narrow range during manufacturing so that disk stack assemblies can be produced with unknown and possibly unacceptable coning.

What is needed is a disk stack assembly where the disks exhibit minimal coning and where the assembly can be manufactured without precise control of the clamping force.

SUMMARY OF THE INVENTION

The invention relates to an improved disk stack assembly for a HDD. The disk stack assembly includes a generally cylindrical hub with a flange having a conical surface that slopes downward, i.e., toward the disk drive base when the assembly is mounted on the spindle motor. The conical flange surface is defined between a radially inner circular ridge and a radially outer circular edge. The bottom disk in the stack is in contact with the flange inner circular ridge. The disk stack assembly also includes a disk clamp with a contact surface having a contact rim that is in contact with either the radially inner portion of the top disk in the stack or a spacer ring. The clamp contact rim is located at approximately the same radial distance from the hub's central cylindrical axis as the flange circular ridge so that the clamping force is applied to the disks close to the area where the disk stack is supported on the conical flange surface.

The disk stack assembly shows unexpectedly minimal disk coning for all of the disks in the disk stack. Additionally, the disks in the stack show minimal variation in coning over a wide range of clamping force. This results in reduced manufacturing time and cost because there is no need to precisely control the clamping force and no need to measure coning in each of the manufactured disk stack assemblies.

For a fuller understanding of the nature and advantages of the present invention, reference should be made to the following detailed description taken together with the accompanying figures.

DETAILED DESCRIPTION OF THE INVENTION

Figure 1:
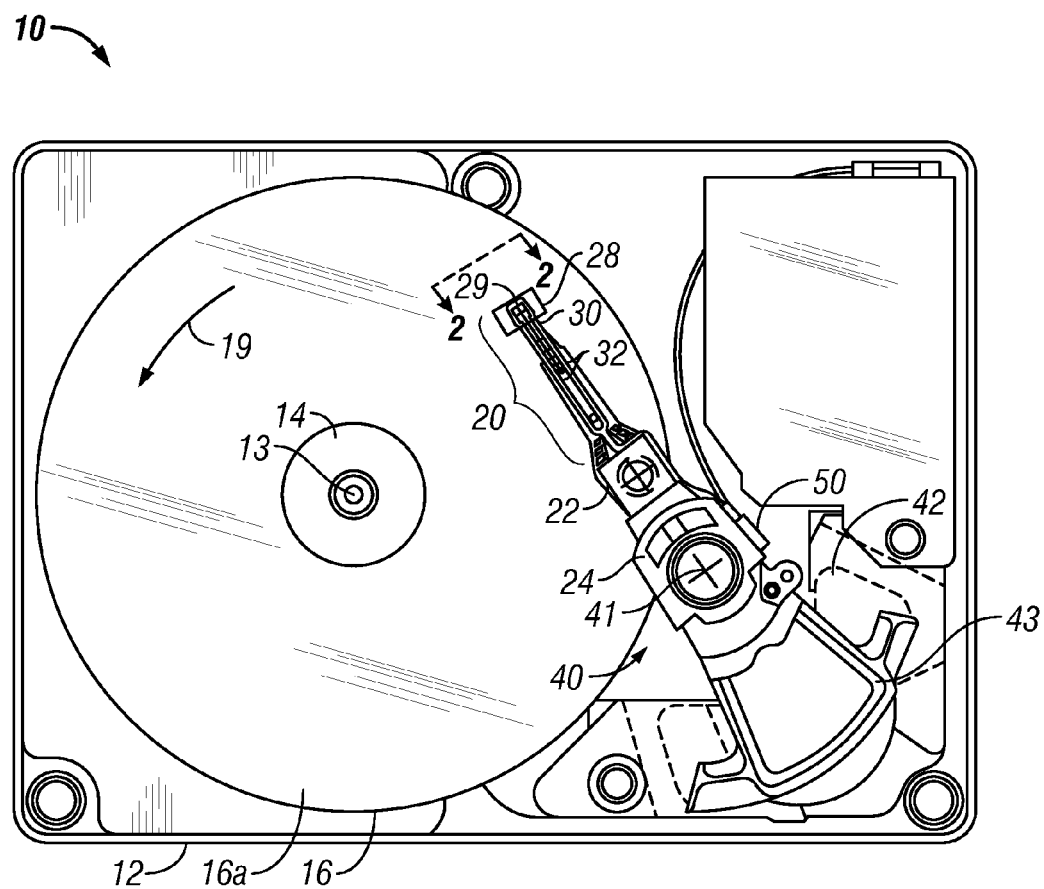
FIG. 1 is a top plan view of a head/disk assembly of a conventional hard disk drive (HDD).

FIG. 1 is a top plan view of a head/disk assembly of a hard disk drive (HDD) 10 with the cover removed. The disk drive 10 includes a rigid base 12 supporting a spindle motor (not shown) that has a central rotational axis 13 and that supports a stack of one or more disks, such as top disk 16 with top surface 16a. The disks, which are rigid disks typically formed of an aluminum/magnesium alloy or a ceramic material, are mounted on a spindle motor hub (not shown) and clamped to the hub by clamp 14. The disks are rotated by the spindle motor in the direction shown by curved arrow 19. The HDD 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to an air-bearing slider 28. A magnetic recording read/write head 29 is located at the end or trailing surface 25 of slider 28. The flexure 30 enables the slider 28 to "pitch" and "roll" on an air-bearing generated by the rotating disk 16. There is typically one load beam assembly and slider associated with each disk surface. HDD 10 also includes a rotary actuator assembly 40 mounted to the rigid base 12 and having a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2:
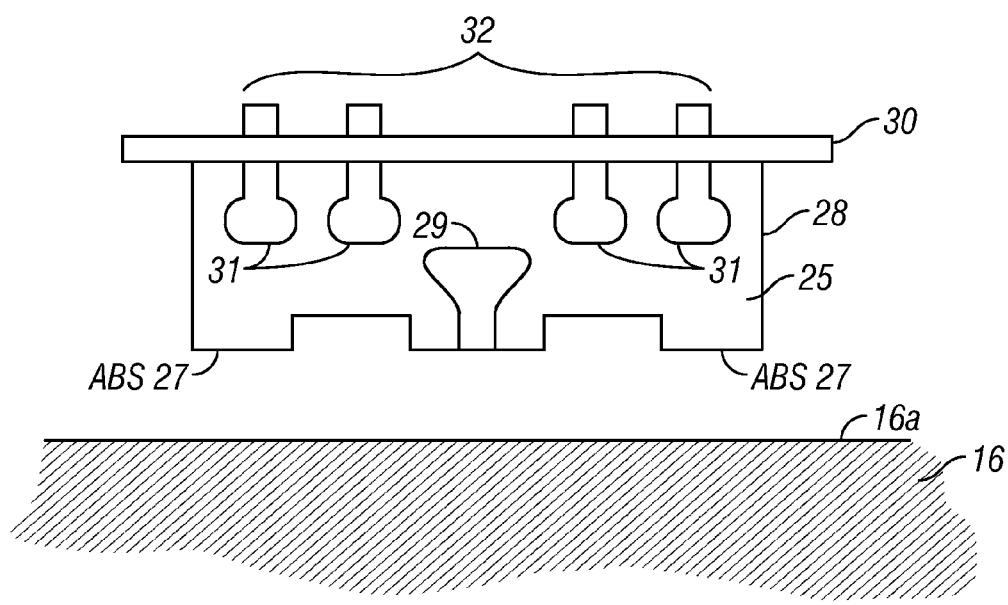
FIG. 2 is an enlarged end view of the slider and a section of the disk taken in the direction 2-2 in FIG. 1.

FIG. 2 is an enlarged end view of the slider 28 and a section of the disk 16 taken in the direction 2-2 in FIG. 1. The read/write head 29 is formed as a series of thin films deposited on the slider 28 on its trailing surface 25. Typically a layer of insulating material, like alumina, is deposited over the read/write head 29 and serves as the outer surface of slider 28. The read/write head 29 is connected to terminal pads 31. The terminal pads 31 connect to the trace array 32 on flexure 30 for electrical connection to the read preamplifier and write driver in chip 50 (FIG. 1). The slider 28 is attached to flexure 30 and has an air-bearing surface (ABS) 27 facing the disk surface 16a and an end or trailing surface 25 generally perpendicular to the ABS 27. The ABS 27 causes the airflow from the rotating disk 16 to generate a bearing of air that supports the slider 28 in very close proximity to or near contact with the surface 16a of disk 16. The distance between the ABS 27 and the surface 16a is called the "fly height". While the fly height of each slider varies as a function of disk radius it is important that the fly height behavior of all the sliders be relatively predictable and consistent for all sliders across their associated disk surfaces. This requires that all the disk surfaces be as perfectly planar as possible.

Figure 3:
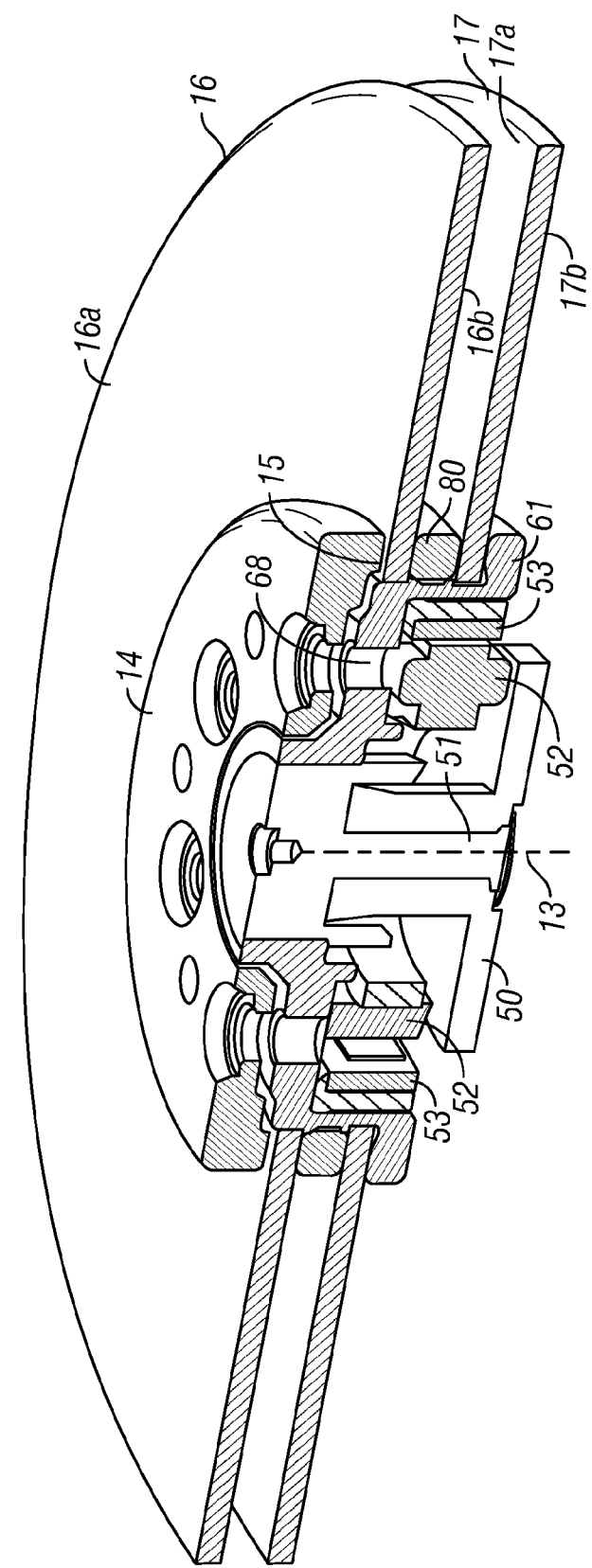
FIG. 3 is a perspective cutaway view showing a conventional HDD spindle motor supporting a disk stack with two disks.

FIG. 3 is a perspective cutaway view showing a conventional HDD spindle motor 50 supporting a disk stack with two disks 16, 17. The spindle motor 50 is mounted to the HDD base 12 (FIG. 1) and has a rotor portion 51 with central rotational axis 13 and a stator portion 52 that includes electrical coils. A conventional spindle motor hub 60 is mounted to rotor portion 51. The hub 60 includes magnets 53 that are attached to the inner portion of the hub 60 facing the stator portion 52. The hub 60 has a flange 61 that supports the lower disk 17. A spacer ring 80 is located over the radially inner portion of lower disk 17 and the upper disk 16 has its radially inner portion in contact with the spacer ring 80. The disk clamp 14 is attached to the hub 60, typically by screws (not shown) threaded into holes 68 in the hub 60, and has a clamping surface 15 in contact with disk surface 16a of upper disk 16. The disk clamp 14 applies a clamping force to the disks to secure the stack of disks between the hub flange 61 and the clamping surface 15. The hub, spacer rings and clamp are typically formed of stainless steel or an aluminum alloy. The spacer rings may also be formed of a ceramic material.

The clamped disks in the disk stack often exhibit "coning" or "cupping", i.e., the disk surfaces have a slight conical shape instead of being perfectly planar. Coning can occur when the radius of the clamp's clamping surface contact point is not equal to the radius of the contact point where the disk contacts the hub flange, so that the clamping force generates a torque on the disks. Also, the clamping force can cause a downward and/or radially inward bending of the flange, which contributes to coning. Coning is undesirable because it affects the fly height of the sliders and can prevent the sliders on different disk surfaces from having generally the same fly height behavior across their respective disk surfaces. As thinner disks come into use to accommodate the need for more compact disk drives, the coning effect becomes even more significant. The extent of coning is related to the amount of clamping force. Even if a disk stack assembly is designed with a supposedly optimum clamping force to minimize coning, it is difficult to control the clamping force to within a narrow range during manufacturing so that disk stack assemblies can be produced with unknown and possibly unacceptable coning.

Figure 4:
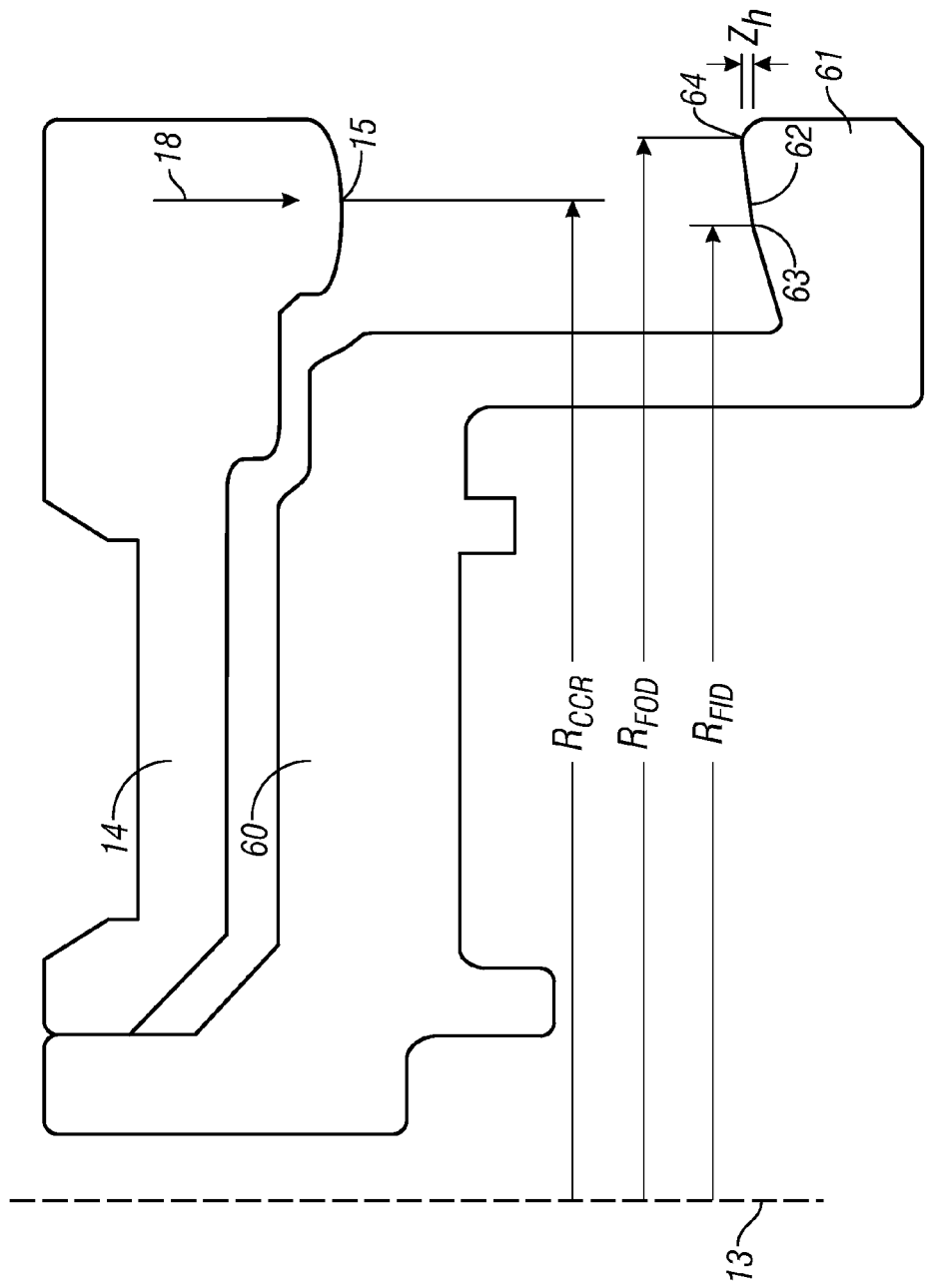
FIG. 4 is a sectional view showing one-half of the prior art hub and disk clamp with the disks and spacer ring removed.

FIG. 4 is an enlarged sectional view showing one-half of the prior art hub 60 and disk clamp 14 with the disks and spacer ring removed. The hub 60 has a flange 61 with a flange surface 62. In the typical prior art hub the flange surface is planar. In the prior art hub of FIG. 4, the flange surface 62 is defined between a radially inner point 63 and radially outer point 64 with point 64 being higher than point 63, i.e., located closer to the clamp 14 in the axial direction. In the sectional view of FIG. 4 the points 63, 64 are points on circles so the surface 62 is a conical section that extends around the circumference of hub 60. The radially inner and outer circles that define the conical flange surface 62 are located at respective radial distances from the central axis of hub 60 shown by flange inner diameter ($R_{FID}$) and flange outer diameter ($R_{FOD}$). The radially outer point 64 is "higher", i.e., closer to disk clamp 14, than the radially inner point 63 by a distance $Z_h$. Thus the radially outer point 64 is shown as a contact point for the lower disk when the disk is located on flange 61 prior to clamping. However, the point 64 is one point of a circular ridge that extends around the flange 61 and serves as a contact ridge for the lower disk. The clamp 14 has a generally curved clamping surface, with a clamp contact point 15 being the lowermost portion of the clamping surface, that contacts the upper disk (or the spacer ring if there is only one disk in the stack). The clamp contact point 15 is actually one point of a circular rim or ring that extends around the clamp 14 and serves as a clamp contact rim. The clamp contact point 15 is located at a radial distance from central axis 13 shown as the radius of the clamp contact rim ($R_{CCR}$). The clamp 14 applies a clamping force (depicted as arrow 18) to the disk stack at the contact rim, shown by contact point 15. In one example of a disk stack with 65 mm diameter disks, $\Delta R$, i.e., $R_{FOD}-R_{FID}$, is about 1 mm and $Z_h$ is about +3 microns for a positive slope ($Z_h/\Delta R$) of the flange surface 62 of about +0.003. Also, $R_{CCR}$ is located between $R_{FID}$ and $R_{FOD}$ and is less than $R_{FOD}$ by about 0.5 mm or more so that the clamping force is not applied directly coincident with the contact ridge shown by contact point 64. With this prior art design for the flange and clamp it was believed that the positive slope of the flange surface 62 would result in an effective movement of the contact point radially inward from point 64 and also counteract any bending of the flange 61, so that the surfaces of the clamped disks would be planar with essentially no coning.

Figure 5:
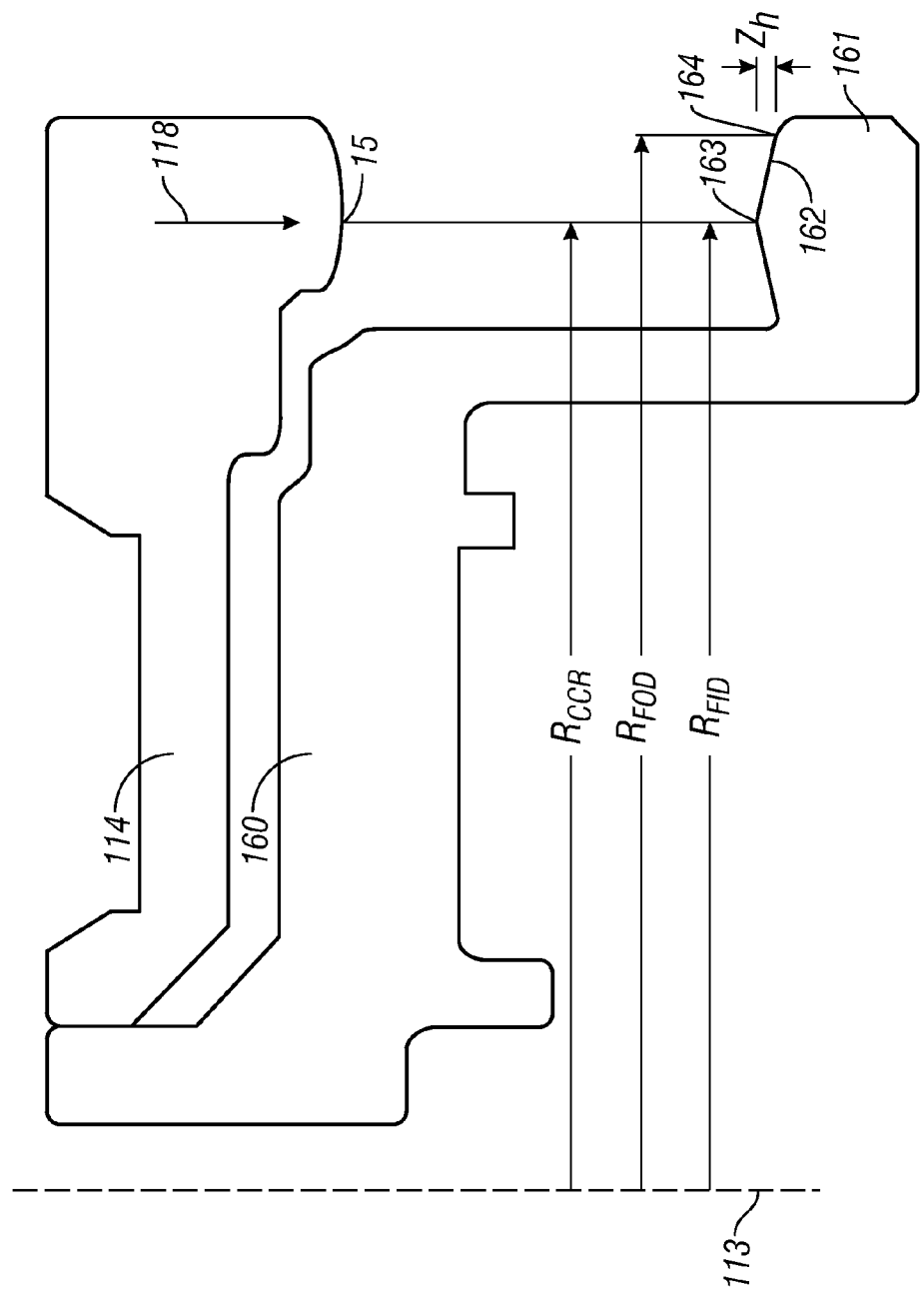
FIG. 5 is a sectional view showing one-half of the hub and disk clamp according to this invention with the disks and spacer ring removed.
Figure 6:
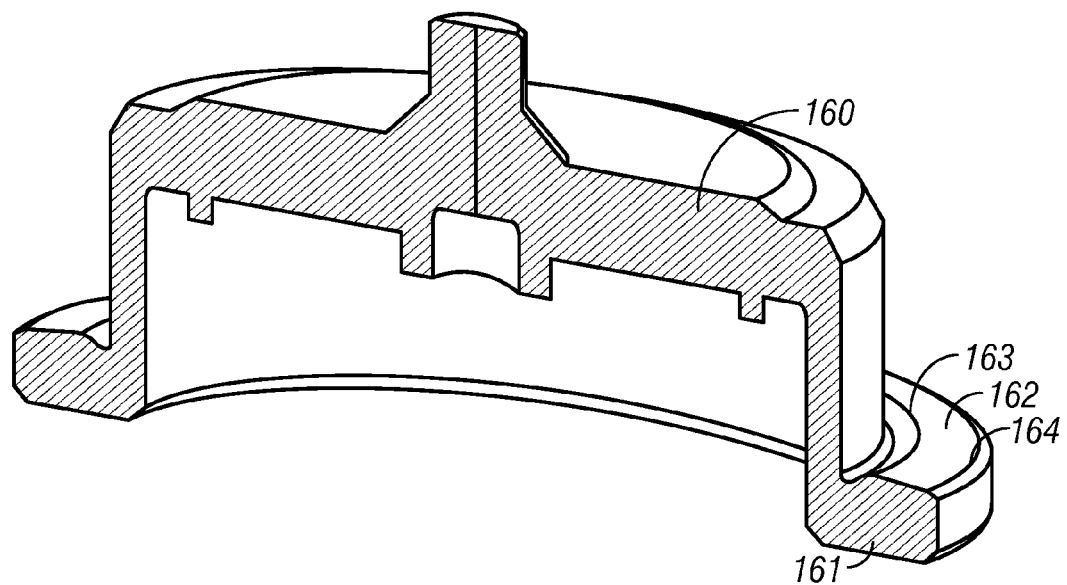
FIG. 6 is a cutaway perspective view of the hub according to this invention showing the conical flange surface with negative slope.

FIG. 5 is an enlarged sectional view showing one-half of the hub 160 and disk clamp 114 according to this invention, with the disks and spacer ring removed. The hub 160 has a flange 161 with a flange surface 162, with the flange surface 162 being sloped downward, i.e., away from the clamp 114. The flange surface 162 is defined between a radially inner point 163 and radially outer point 164. In the sectional view of FIG. 5 the points 163, 164 are points on circles and the surface 162 is a conical section that extends around the circumference of hub 160. This is shown in FIG. 6, which is a cutaway perspective view of hub 160. The radially inner and outer circles that define the conical flange surface 162 are located at respective radial distances from the central axis 113 of hub 160 shown by flange inner diameter ($R_{FID}$) and flange outer diameter ($R_{FOD}$). The radially outer point 164 is "lower", i.e. farther from disk clamp 114, than the radially inner point 163 by a distance $Z_h$. Thus the radially inner point 163 is shown as a contact point for the lower disk when the disk is located on flange 161 prior to clamping. However, the point 163 is one point of a circular ridge that extends around the flange 161 and serves as a contact ridge for the lower disk. The point 164 is one point of a circular edge that extends around the flange 161 and serves as the radially outer edge of the conical flange surface 162. The clamp 114 has a clamping surface with a contact point 115 that contacts the upper disk (or the spacer ring if there is only one disk in the stack). The clamp contact point 115 is actually one point of a circular rim or ring that extends around the clamp 114 and serves as a clamp contact rim. The clamp contact point 115 is located at a radial distance from central axis 113 shown as the radius of the clamp contact rim ($R_{CCR}$). The clamp 114 applies a clamping force (depicted as arrow 118) to the disk stack at the contact rim, shown by contact point 15. Also, in the disk stack assembly of this invention, $R_{CCR}$ is approximately equal to $R_{FID}$, the radial location of the contact ridge, so the clamping force is applied much closer to the contact ridge than in the prior art of FIG. 4. In one example of a disk stack with 65 mm diameter disks, $R_{FOD}$=14.475 mm, $R_{FID}$=13.600 mm, $R_{CCR}$=13.625 mm, and $Z_h$ is about −3 microns. Preferably $R_{CCR}$ and $R_{FID}$ are within 0.25 mm of each other in this example. Thus ΔR is 0.875 mm. For a ΔR of about 1 mm, $Z_h$ can be between −1 and −10 microns for a negative slope ($Z_h$/ΔR) of the flange surface 162 between about −0.001 and −0.010. Preferably $Z_h$ is between −2 and −4 microns for a negative slope ($Z_h$/ΔR) of the flange surface 162 between about −0.002 and −0.004.

Figure 7:
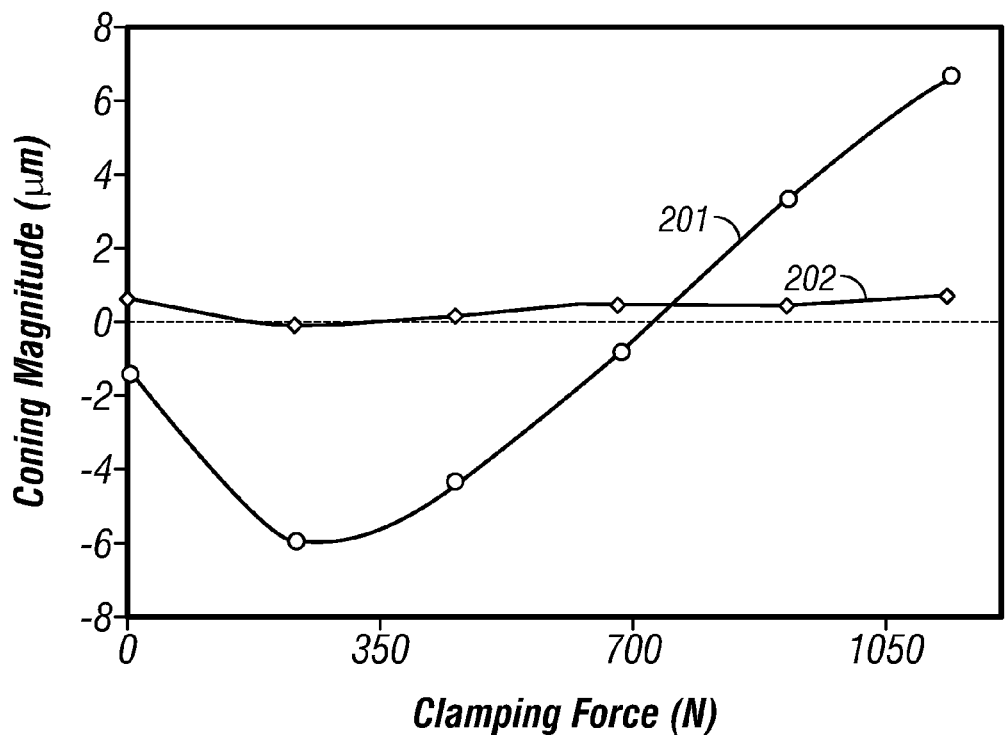
FIG. 7 is a graph comparing disk coning magnitude for a single disk as a function of clamping force for the prior art disk stack assembly and the disk stack assembly according to this invention with a single disk.

The disk stack assembly fabricated with the hub 160 and clamp 114 (FIG. 5) according to this invention shows unexpectedly minimal disk coning and a significant and unexpected improvement over the disk stack assembly of the prior art with hub 60 and clamp 14 (FIG. 4). FIG. 7 is a graph of disk coning magnitude for a single disk as a function of clamping force for the prior art disk stack assembly with a single disk and the disk stack assembly according to this invention with a single disk. The disk coning magnitude (given in microns in FIG. 7) is a measure of the axial height of the disk surface at the disk outside diameter (OD) above or below a baseline of zero at the disk inside diameter (ID). In FIG. 7, curve 201 represents the disk coning of the prior art with a flange surface having a positive slope of about +0.003 ($Z_h$=+3 microns), wherein the disk stack assembly has an optimum design clamping force of about 700 Newtons (N). Thus if all disks were manufactured with precisely this amount of clamping force, the disk coning magnitude would be an acceptable −1 micron. However, it is known that during manufacturing the clamping force may vary by up to 50% from the optimum design value, so curve 201 shows that the coning magnitude can vary from about −5 microns to about +5 microns over the range from 350 N to 1050 N. In contrast, curve 202 represents the disk coning of the disk stack assembly according to this invention with a flange surface having a negative slope of about −0.003 ($Z_h$=−3 microns). Curve 202 shows minimal variation in coning magnitude with clamping force. In fact, over a range even greater than between 350 N to 1050 N, the coning magnitude is less than +1 micron. Thus FIG. 7 shows that the invention results not only in improved disk stack assemblies, but also in reduced manufacturing cost because there is no need to precisely control the clamping force and no need for the time and tooling to measure coning in each of the manufactured disk stack assemblies.

Figure 8:
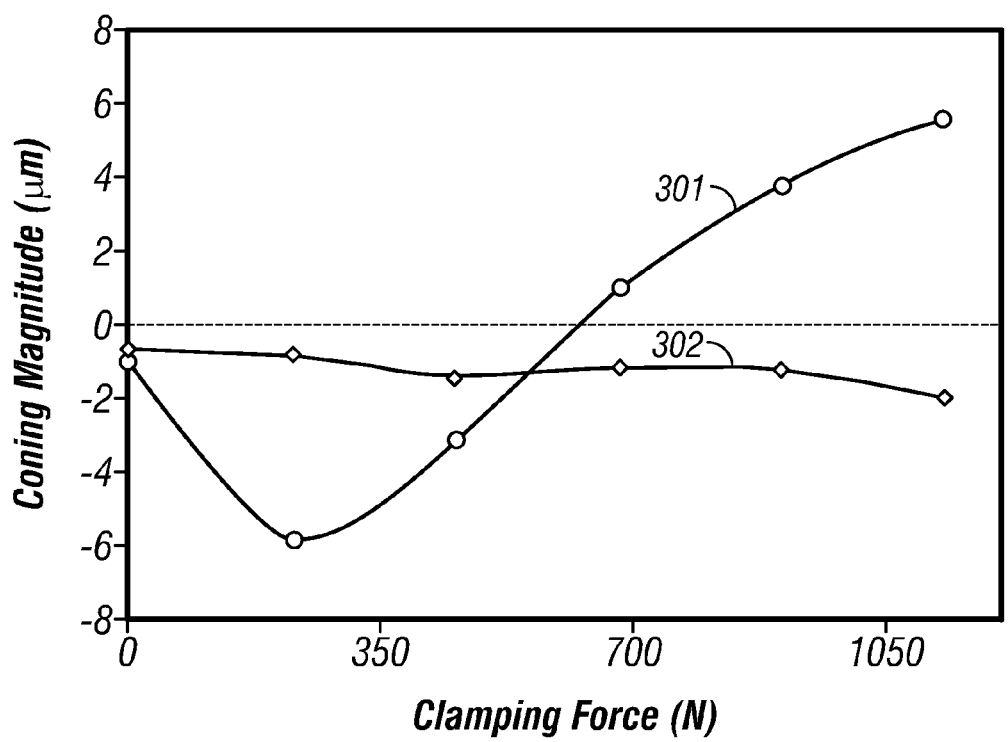
FIG. 8 is a graph comparing disk coning magnitude for the upper disk as a function of clamping force for the prior art disk stack assembly and the disk stack assembly according to this invention with two disks in the stack.

FIG. 8 is a graph like the graph of FIG. 7 but for the coning magnitude of the upper disk in a prior disk stack assembly with two disks (curve 301) and in the upper disk in a disk stack assembly according to this invention with two disks (curve 302). FIG. 8 shows that the upper disk in a two-disk assembly according to this invention has similar improvement in coning magnitude variation as the single-disk assembly of FIG. 7.

Figure 9:
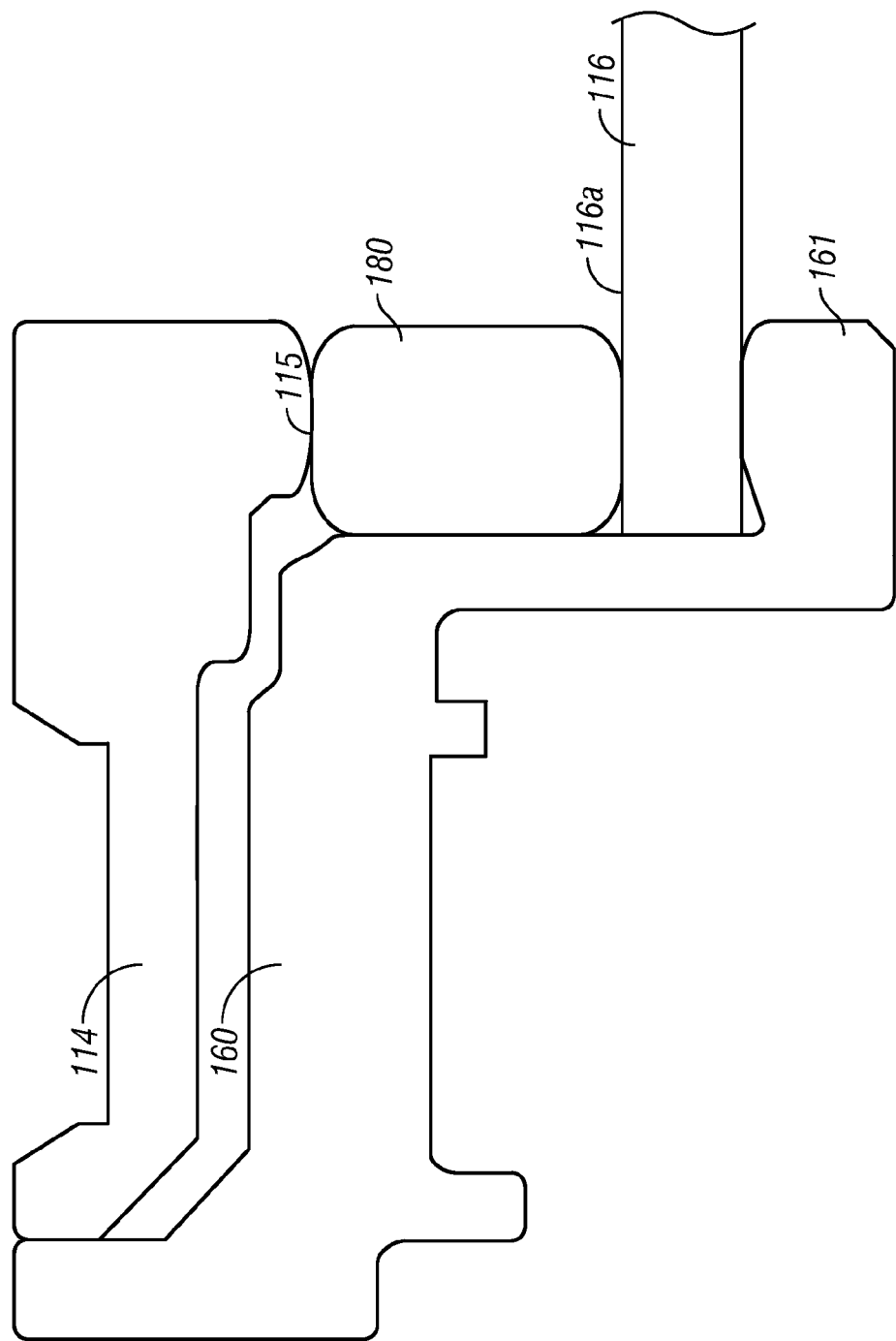
FIG. 9 is a sectional view of half of the disk stack assembly with a single disk according to this invention.
Figure 10:
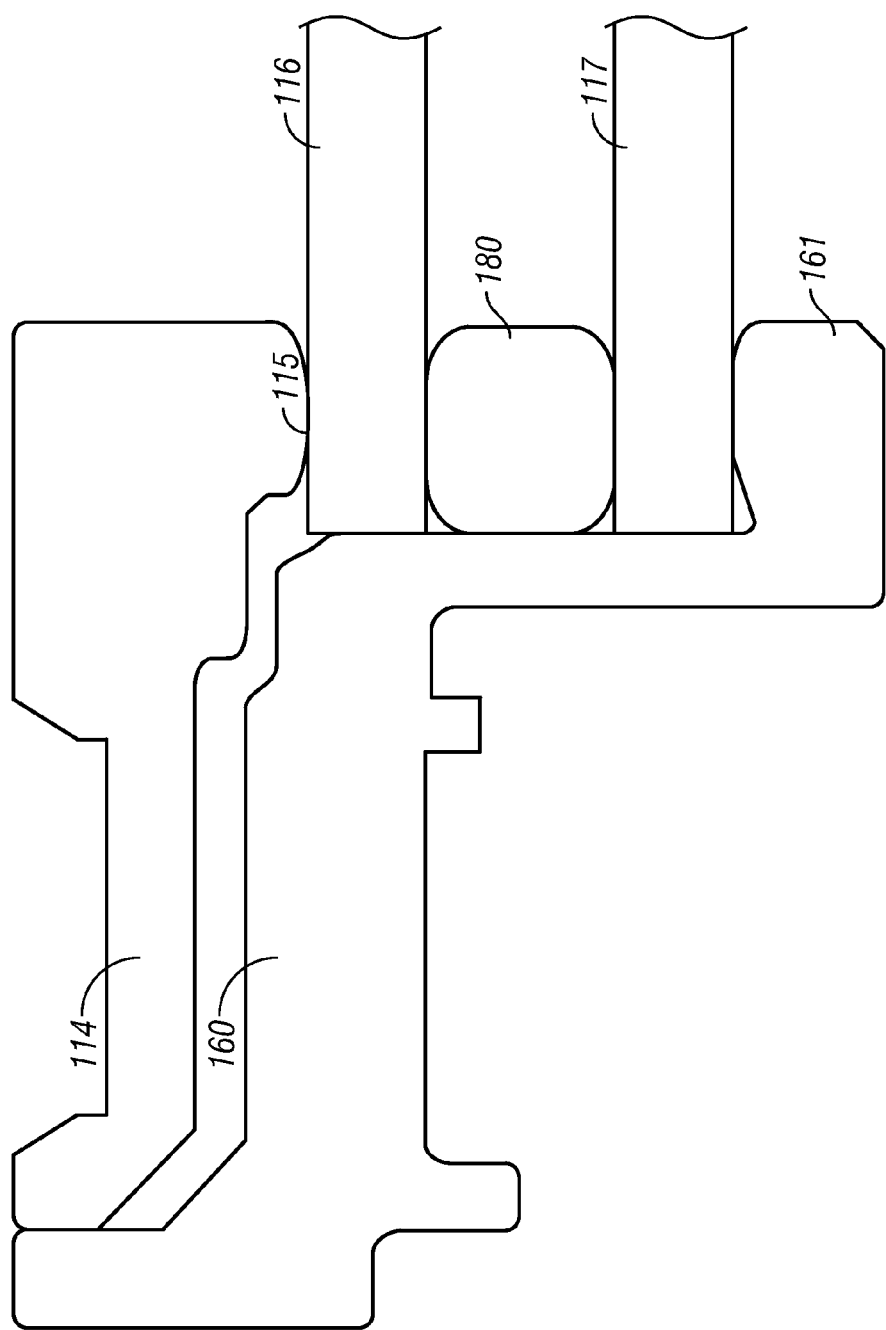
FIG. 10 is a sectional view of half of the disk stack assembly with two disks according to this invention.

FIG. 9 is a sectional view of half of the disk stack assembly with a single disk according to this invention and illustrates the hub 160 with flange 161, disk 116, spacer ring 180 and clamp 114 with clamping contact point 115. In the single-disk assembly of FIG. 9, the spacer ring 180 is an optional feature since it is possible that the clamp 114 can be designed to have its contact surface 115 in direct contact with the upper surface 116a of the single disk 116. FIG. 10 is a sectional view of half of the disk stack assembly with two disks according to this invention and illustrates the second or lower disk 117 located on flange 161 and upper disk 116 located between spacer ring 180 and clamp 114. Of course it is understood to those skilled in the art that the disk stack assembly according to this invention may have more than two disks.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk stack assembly for attachment to a disk drive spindle motor having an axis of rotation, the assembly comprising:
   a spindle motor hub having a central axis coincident with the spindle motor axis when mounted on the spindle motor and an outer cylindrical surface;
   a flange extending from the outer cylindrical surface of the hub for supporting a disk, the flange having a generally conical surface defined by a radially inner circular ridge and a radially outer circular edge, the radial difference between the radially inner circular ridge and the radially outer circular edge being ΔR and the axial spacing between the radially inner circular ridge and the radially outer circular edge being $Z_h$, and wherein the sloe $Z_h$/ΔR is between −0.001 and −0.01;
   a disk having its radially inner portion on the flange and in contact with the ridge, whereby the flange conical surface diverges away from the disk in the radially outward direction;
   a disk spacer ring on the radially inner portion of the disk; and
   a clamp attached to the hub and having a clamping surface for clamping the spacer ring and disk.

2. The assembly of claim 1 wherein the slope $Z_h$/ΔR is between −0.002 and −0.004.

3. The assembly of claim 1 wherein the clamping surface of the clamp has a clamp contact rim located at a radial distance from the central axis of the hub that is generally equal to the radial distance of the radially inner circular ridge of the flange.

4. The assembly of claim 1 wherein the disk is a first disk and the spacer ring is a first spacer ring and further comprising a second disk having its radially inner portion on the first spacer ring.

5. The assembly of claim 1 wherein the disk is a 65 mm diameter disk, wherein the radially inner circular ridge is axially spaced from the clamp clamping surface, and wherein the radially outer circular edge is spaced axially from the clamp clamping surface by a distance between 2 and 4 microns greater than the axial spacing of the inner circular ridge from the clamp clamping surface.

6. The assembly of claim 5 wherein the clamping surface of the clamp has a clamp contact rim located at a radial distance $R_{CCR}$ from the central axis of the hub, wherein the radially inner circular ridge is located at a radial distance $R_{FID}$ from the central axis of the hub, and wherein the absolute value of $R_{CCR}-R_{FID}$ is less than 0.25 mm.

7. A magnetic recording hard disk drive comprising:
a base;
a spindle motor attached to the base and having a stator and a rotor;
the disk stack assembly of claim 1 wherein the spindle motor hub is mounted to the rotor of the spindle motor;
an air-bearing slider maintained near the surface of the disk and supporting a read/write head; and
an actuator attached to the base and connected to the slider for moving the slider across the surface of the disk.

8. A hard disk drive (HDD) disk stack assembly comprising:
a hub having an outer cylindrical surface, the cylindrical surface being centered along a hub central axis;
a flange extending from the outer cylindrical surface of the hub, the flange having a generally conical surface defined by a radially inner circular ridge and a radially outer circular edge;
a 65 mm diameter disk having its radially inner portion on the flange and in contact with the radially inner circular ridge of the flange, whereby the flange conical surface diverges away from the disk in the radially outward direction; and
a clamp attached to the hub for clamping the disk, the clamp having a clamp contact rim; wherein the radially inner circular ridge is axially spaced from the clamp contact rim and the radially outer circular edge is axially spaced from the clamp contact rim by a distance between 2 and 4 microns greater than the axial spacing of the inner circular ridge from the clamp contact rim.

9. The assembly of claim 8 wherein the radial difference between the radially inner circular ridge and the radially outer circular edge is $\Delta R$ and the axial spacing between the radially inner circular ridge and the radially outer circular edge is $Z_h$, and wherein the slope $Z_h/\Delta R$ is between −0.002 and −0.004.

10. The assembly of claim 8 wherein the clamp contact rim is located at a radial distance from the central axis of the hub that is generally equal to the radial distance of the radially inner circular ridge of the flange from the central axis of the hub.

11. The assembly of claim 8 further comprising a spacer ring between the radially inner portion of the disk and the clamp and wherein the clamp contact rim is in contact with the spacer ring.

12. The assembly of claim 8 wherein the disk is a first disk and further comprising a spacer ring on the radially inner portion of the first disk and a second disk having its radially inner portion on the spacer ring and wherein the clamp contact rim is in contact with the radially inner portion of the second disk.

13. The assembly of claim 8 wherein the clamp contact rim is located at a radial distance $R_{CCR}$ from the central axis of the hub, wherein the radially inner circular ridge is located at a radial distance $R_{FID}$ from the central axis of the hub, and wherein the absolute value of $R_{CCR}-R_{FID}$ is less than 0.25 mm.

14. A disk stack assembly for attachment to a disk drive spindle motor having an axis of rotation, the assembly comprising:
a spindle motor hub having a central axis coincident with the spindle motor axis when mounted on the spindle motor and an outer cylindrical surface;
a flange extending from the outer cylindrical surface of the hub for supporting a disk, the flange having a generally conical surface defined by a radially inner circular ridge and a radially outer circular edge;
a 65 mm diameter disk having its radially inner portion on the flange and in contact with the ridge, whereby the flange conical surface diverges away from the disk in the radially outward direction;
a disk spacer ring on the radially inner portion of the disk; and
a clamp attached to the hub and having a clamping surface for clamping the spacer ring and disk; wherein the radially inner circular ridge is axially spaced from the clamp clamping surface and the radially outer circular edge is axially spaced from the clamp clamping surface by a distance between 2 and 4 microns greater than the axial spacing of the inner circular ridge from the clamp clamping surface.

15. The assembly of claim 14 wherein the radial difference between the radially inner circular ridge and the radially outer circular edge is $\Delta R$ and the axial spacing between the radially inner circular ridge and the radially outer circular edge is $Z_h$, and wherein the slope $Z_h/\Delta R$ is between −0.001 and −0.01.

16. The assembly of claim 14 wherein the clamping surface of the clamp has a clamp contact rim located at a radial distance from the central axis of the hub that is generally equal to the radial distance of the radially inner circular ridge of the flange.

17. The assembly of claim 14 wherein the disk is a first disk and the spacer ring is a first spacer ring and further comprising a second disk having its radially inner portion on the first spacer ring.

18. The assembly of claim 14 wherein the clamping surface of the clamp has a clamp contact rim located at a radial distance $R_{CCR}$ from the central axis of the hub, wherein the radially inner circular ridge is located at a radial distance $R_{FID}$ from the central axis of the hub, and wherein the absolute value of $R_{CCR}-R_{FID}$ is less than 0.25 mm.

* * * * *